United States Patent
Tsai et al.

(10) Patent No.: US 7,107,579 B2
(45) Date of Patent: Sep. 12, 2006

(54) PRESERVING PROGRAM CONTEXT WHEN ADDING PROBE ROUTINE CALLS FOR PROGRAM INSTRUMENTATION

(75) Inventors: Jenn-Yuan Tsai, Cupertino, CA (US); Vinodha Ramasamy, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 665 days.

(21) Appl. No.: 10/143,429

(22) Filed: May 9, 2002

(65) Prior Publication Data

US 2003/0212988 A1    Nov. 13, 2003

(51) Int. Cl.
G06F 9/44    (2006.01)

(52) U.S. Cl. .................. 717/127; 717/128; 717/129; 717/130

(58) Field of Classification Search ........ 717/124–135, 717/138, 140, 158, 109; 707/10; 714/46
See application file for complete search history.

(56) References Cited

U.S. PATENT DOCUMENTS

| | | | | |
|---|---|---|---|---|
| 5,313,616 A | * | 5/1994 | Cline et al. ................. | 717/127 |
| 5,481,712 A | * | 1/1996 | Silver et al. ................ | 717/109 |
| 5,539,907 A | * | 7/1996 | Srivastava et al. .......... | 717/130 |
| 5,632,034 A | * | 5/1997 | O'Farrell ..................... | 717/140 |
| 5,732,273 A | * | 3/1998 | Srivastava et al. .......... | 717/128 |
| 5,901,315 A | * | 5/1999 | Edwards et al. ............ | 717/124 |
| 5,966,541 A | * | 10/1999 | Agarwal ..................... | 717/132 |
| 5,987,250 A | * | 11/1999 | Subrahmanyam ........... | 717/130 |
| 6,144,961 A | * | 11/2000 | de la Salle .................. | 707/10 |
| 6,199,202 B1 | * | 3/2001 | Coutant et al. ............. | 717/138 |

(Continued)

OTHER PUBLICATIONS

Ferrero, Software for personal instruments, IEEE, vol. 39, Issue 6, Dec. 1990, pp. 281-286.*

Vash, Instrumenting embedded test software in support system integration, factory production, and depot repair, IEEE, vol. 17, Issue 10, Oct. 2002, pp. 19-22.*

(Continued)

*Primary Examiner*—Wei Zhen
*Assistant Examiner*—Satish S. Rampuria (57) ABSTRACT

Method and apparatus for preserving program context when causing execution of a probe routine from a target routine of an executable computer program code. Executable code for the probe routine is created such that the probe routine does not reference a first set of registers that are usable by the target routine. A modified version of the target routine is created to cause execution of the probe routine. The modified version of the target routine is performed instead of the original version when the target routine is called during program execution. A second set of registers on the processor register stack is allocated when the probe routine is invoked. The second set of registers is not manipulated by the probe routine so as to avoid changing contents of registers of the register stack that are used by the target routine.

19 Claims, 5 Drawing Sheets

U.S. PATENT DOCUMENTS

| | | | |
|---|---|---|---|
| 6,202,199 B1* | 3/2001 | Wygodny et al. | 717/125 |
| 6,305,010 B1* | 10/2001 | Agarwal | 717/126 |
| 6,327,700 B1* | 12/2001 | Chen et al. | 717/127 |
| 6,397,379 B1* | 5/2002 | Yates et al. | 717/140 |
| 6,397,382 B1* | 5/2002 | Dawson | 717/130 |
| 6,481,008 B1* | 11/2002 | Chaiken et al. | 717/158 |
| 6,587,969 B1* | 7/2003 | Weinberg et al. | 714/46 |
| 6,802,054 B1* | 10/2004 | Faraj | 717/128 |
| 6,848,097 B1* | 1/2005 | Alverson et al. | 717/124 |
| 2002/0188929 A1* | 12/2002 | Cyran et al. | 717/125 |
| 2003/0056200 A1* | 3/2003 | Li et al. | 717/128 |
| 2004/0025145 A1* | 2/2004 | Dawson | 717/129 |

OTHER PUBLICATIONS

Neblett, Implementing reusable, instrument independent test program in the factory, IEEE, Sep. 1996, pp. 206-212.*

So-Zen et al., A multi-probe approach for MCM substrate testing, IEEE, vol. 13, Issue 1, Jan. 1994 pp. 110-121.*

Nan-Chi Chou et al., Dynamic probe scheduling optimization for MCM substrate test, IEEE, vol. 17, Issue 2, May 1994 pp. 182-189.*

Pendurkar et al., Single-probe traversal optimization for testing of MCM substrate interconnections, IEEE, vol. 18, Issue 8, Aug. 1999 pp. 1178-1191.*

* cited by examiner

PRESERVING PROGRAM CONTEXT WHEN ADDING PROBE ROUTINE CALLS FOR PROGRAM INSTRUMENTATION

FIELD OF THE INVENTION

The present invention generally relates to instrumentation of executable computer programs, and more particularly to insertion of probe routine calls in instrumenting programs.

BACKGROUND

Functions and procedures are well-known constructs that are used in creating modular programs. Nesting function and procedure calls further supports hierarchical program designs, thereby supporting multiple levels of design abstraction.

Functions and procedures often include parameters for passing data. A function typically has only input parameters, and a call to the function often returns a value. A procedure may have both input and output parameters. For ease of reference, functions and procedures are referenced herein as "routines."

Many processor architectures use a register stack and a register renaming mechanism to pass parameter values between routine calls. The processor associates selected registers with parameters of a routine when a routine is called. The register stack includes multiple registers and a stack pointer that references the set of registers at the top of the stack for the most recently called routine. With each nested routine call, additional registers from the register stack are associated with the parameters of the called routine. Other registers that a routine uses during execution for temporary storage of data are referred to as "scratch" registers.

Tools that support analysis of an executing program must account for behavior of the register stack and a routine's usage of scratch registers in order to avoid corrupting data referenced by the routines in the program. Analysis of binary executable programs is performed to analyze program performance, verify correctness, and test correct runtime operation, for example. Some analyses are performed prior to runtime (static analysis), while other analyses are performed during runtime (dynamic analysis). For both static and dynamic analysis, however, the analysis is often performed at the routine level.

One category of analysis performed on executable programs is "instrumentation". Instrumentation is generally used to gather runtime characteristics of a program. For example, the number of times that a routine is executed while the application is executing is determined through instrumentation. Such instrumentation is sometimes accomplished by inserting a call to a probe routine at a selected point in the program. The probe routine performs instrumentation-related operations.

When inserting a probe routine call, the instrumentation tool must preserve the contents of the register stack so that invocation of the probe routine does not corrupt the contents of the registers, which are associated with parameters of the routine from which the probe routine was called. One approach to preserving the register stack is to save the contents of registers on the memory stack of the calling routine. However, this is costly in terms of execution time, especially if the routine from which the probe routine was invoked is called many times during program execution.

A system and method that address the aforementioned problems, as well as other related problems, are therefore desirable.

SUMMARY OF THE INVENTION

The present invention preserves program context when causing execution of a probe routine from a target routine of an executable computer program code. Executable code for the probe routine is created such that the probe routine does not reference a first set of registers that are usable by the target routine. A modified version of the target routine is created to cause execution of the probe routine. The modified version of the target routine is performed instead of the original version when the target routine is called during program execution. A second set of registers on the processor register stack is allocated when the probe routine is invoked. The second set of registers is not manipulated by the probe routine so as to avoid changing contents of registers of the register stack that are used by the target routine.

Various example embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1A:
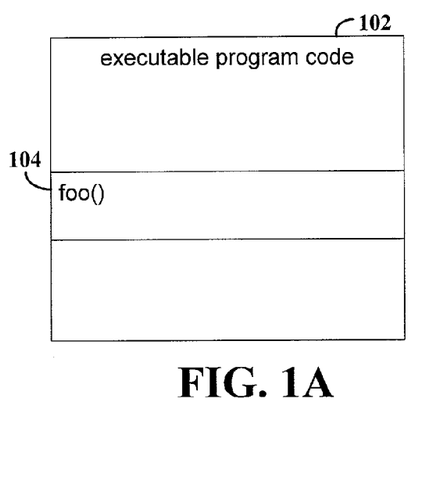
FIG. 1A is a block diagram that illustrates an example executable program that includes a routine foo( )

FIG. 1A is a block diagram that illustrates an example executable program that includes a routine foo( ) 104. A typical scenario for instrumenting a routine is to insert a call to a probe routine that performs some desired processing relative to the routine. For example, the probe routine may simply count the number of times that the instrumented routine is called. Some instrumentation tools create a modified version of the routine to be instrumented. The routine to be instrumented is referenced herein as the "target" routine. In creating the modified version of the target routine, the target routine itself is modified such that when the target routine is invoked during program execution, the modified version of the routine is performed instead of the performing the target routine.

Figure 1B:
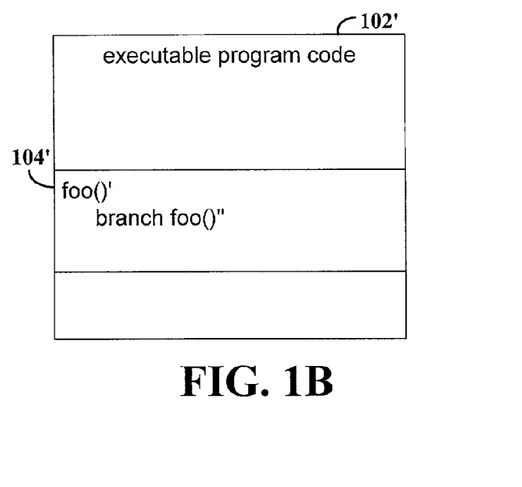
FIG. 1B illustrates the executable program after having been instrumented.
Figure 1C:
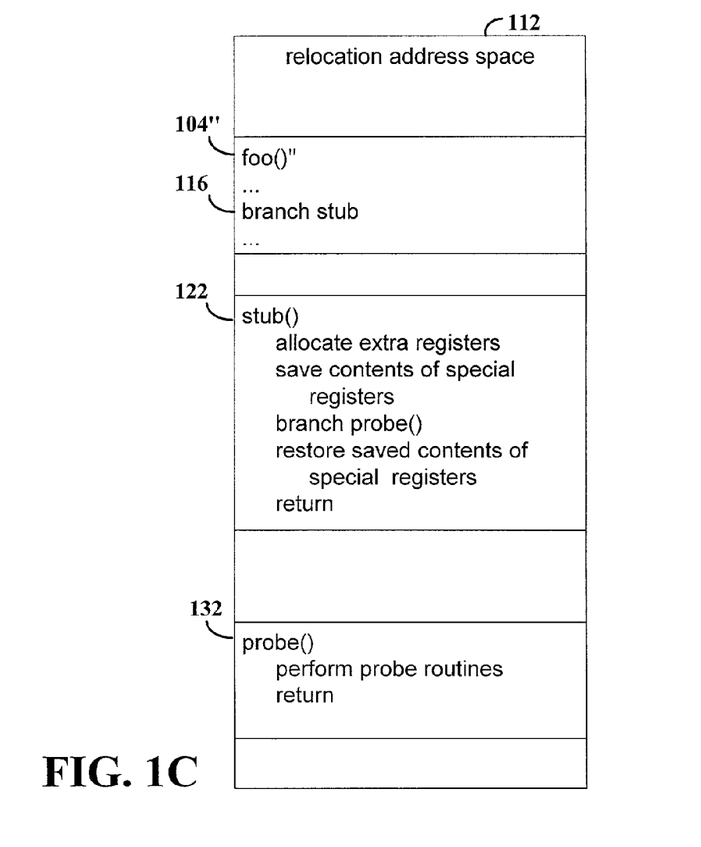
FIG. 1C illustrates memory space used in support of instrumenting the executable program in accordance with one embodiment of the invention.

FIG. 1B illustrates the executable program after having been instrumented. Target routine foo( )' 104' has its first instruction replaced with a branch to foo( )" 104" in relocation address space 112 of FIG. 1C. Routine foo( )" is the instrumented version of foo( ) and branches to stub routine 122. The location in foo( )" at which the branch to the stub routine is inserted depends on the code of the target routine and on the particular instrumentation processing of the probe routine. The stub( ) routine 122 saves and restores the context of foo( )" so that when the probe( ) routine 132 is complete and control is returned to foo( )", foo( )" has the same data after execution of the probe( ) routine as before execution of the probe( ) routine. Specifically, all relevant registers remain unmodified.

Some processors, for example, the IA-64 processor architecture by Hewlett-Packard, have different sets of registers that are used for different purposes during program execution. A first set of registers can be used by a routine as "scratch" registers for the purpose of temporary storage of data during execution of the routine. Another set of registers is used by the processor for passing parameters between caller and called routines. One approach to saving the context of a routine is to save the contents of all the registers in the calling routine's memory stack. However, this approach is costly in terms of program execution time. In one embodiment of the invention, the probe( ) routine is created such that no scratch registers are used, for example, by compiling the routine with special compiler options. This reduces the context information that needs to be saved.

The stub( ) routine saves the contents of other registers, for example, the return-address register which stores the address to which control is to be returned (in the routine that called foo( )). The stub( ) routine also allocates extra registers of the type used in passing parameters ("parameter registers"). These additional parameter registers are not used by either the stub( ) or probe( ) routines and serve as placeholders on the processor's register stack.

Figure 2:
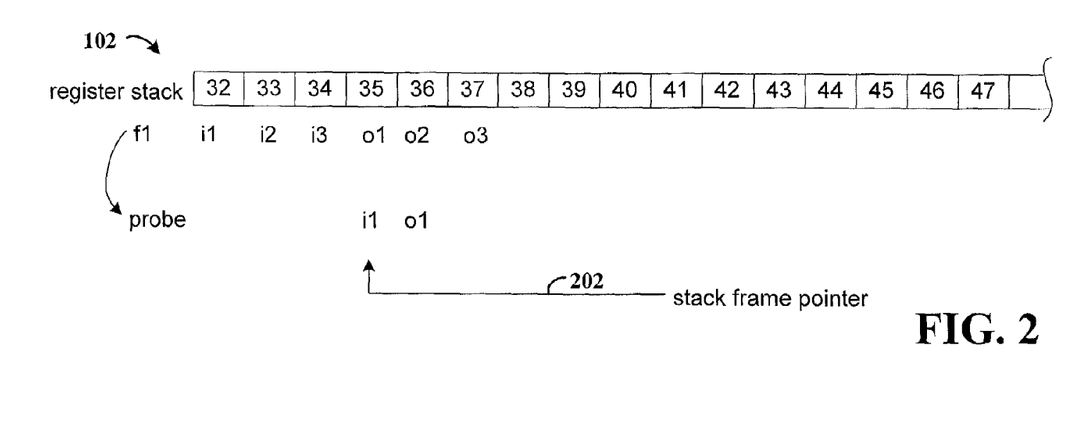
FIG. 2 illustrates a register stack, parameters associated with routine calls, and a probe routine call inserted in target routine f1( )

FIG. 2 illustrates a register stack 200, parameters associated with routine calls, and a probe( ) routine call inserted in target routine f1( ). The call sequence illustrates how parameter registers are mapped to the register stack, and how an inserted probe( ) routine call affects the parameter registers if actions are not taken to preserve the parameter registers. In the example IA-64 processor architecture, general registers numbered 32 through 127 form a register stack that is automatically managed across procedure calls and returns. For each routine call, a frame of the register stack is divided into two dynamically-sized regions—one for input parameters and local variables and another for output parameters. On a routine call, the registers are automatically renamed by the processor so that the calling routine's output registers form the base of the called routine's register stack frame. On return to the calling routine the registers are restored to the previous state so that input and local registers are preserved across the routine call. An alloc instruction is used at the beginning of a routine to allocate the input, local, and output registers.

Routine f1 has allocated registers 32–24 for input parameters and local registers (i1–i3) and registers 35–37 for output parameters (o1–o3). If a call to probe( ) is inserted in f1 and probe is called, the processor bases the register stack frame for probe at the register (35) of the first output parameter of f1. Note that the stack frame pointer 202 references the base of the register stack frame associated with the most recently called routine. If probe has one input parameter and one output parameter, the input parameter i1 of probe overlaps the output parameter o1 of f1. Thus, if probe modifies registers 35 and 36, data provided by f1 may be corrupted. In one embodiment of the invention, the stub( ) routine allocates additional parameter registers so that the registers manipulated by the probe routine do not overlap the output registers of the target routine.

Figure 3:
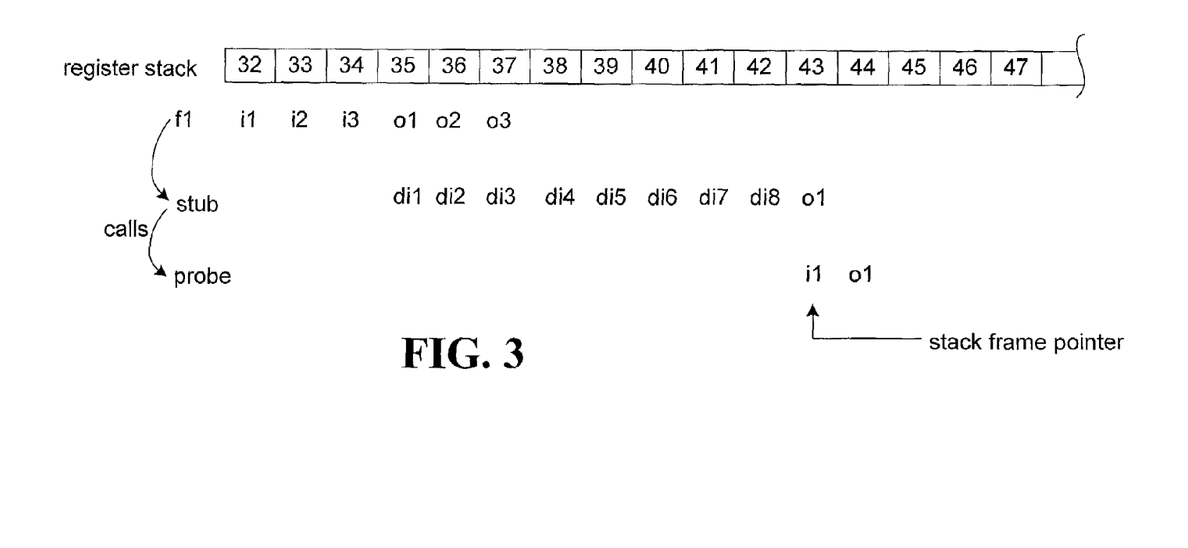
FIG. 3 illustrates a register stack and a routine call sequence in which target routine f1( ) is instrumented by a probe routine, and the context of f1( ) is preserved in accordance with one embodiment of the invention.

FIG. 3 illustrates a register stack and a routine call sequence in which target routine f1( ) is instrumented by a probe routine, and the context of f1( ) is preserved in accordance with one embodiment of the invention. Instead of inserting call to probe directly in the code of f1, a call to stub is inserted, and stub allocates dummy input parameter registers before calling probe. The number of dummy input registers that are allocated is architecture dependent. In the example embodiment, 8 dummy registers are allocated because the architecture allows at most 8 registers to be used for parameter passing. Thus, if a target routine has 8 output parameters, the 8 dummy registers of stub would overlap the 8 output register of the target routine. In the example of FIG. 3, dummy input parameters di1, di2, and di3 overlap output parameters o1, o2, and o3, respectively, for registers 35, 36, and 37.

The stub routine calls probe, which has one input parameter (i1) and one output parameter (o1). The input parameter i1 of probe is aligned with the first output parameter o1 of stub in using register 43. It will be appreciated that the stub code would generally not have output parameters. However, in this example the stub routine is shown as having an output parameter o1 for purposes of illustration, and i1 of probe is aligned with register 43, which is after the input registers of stub.

Figure 4:
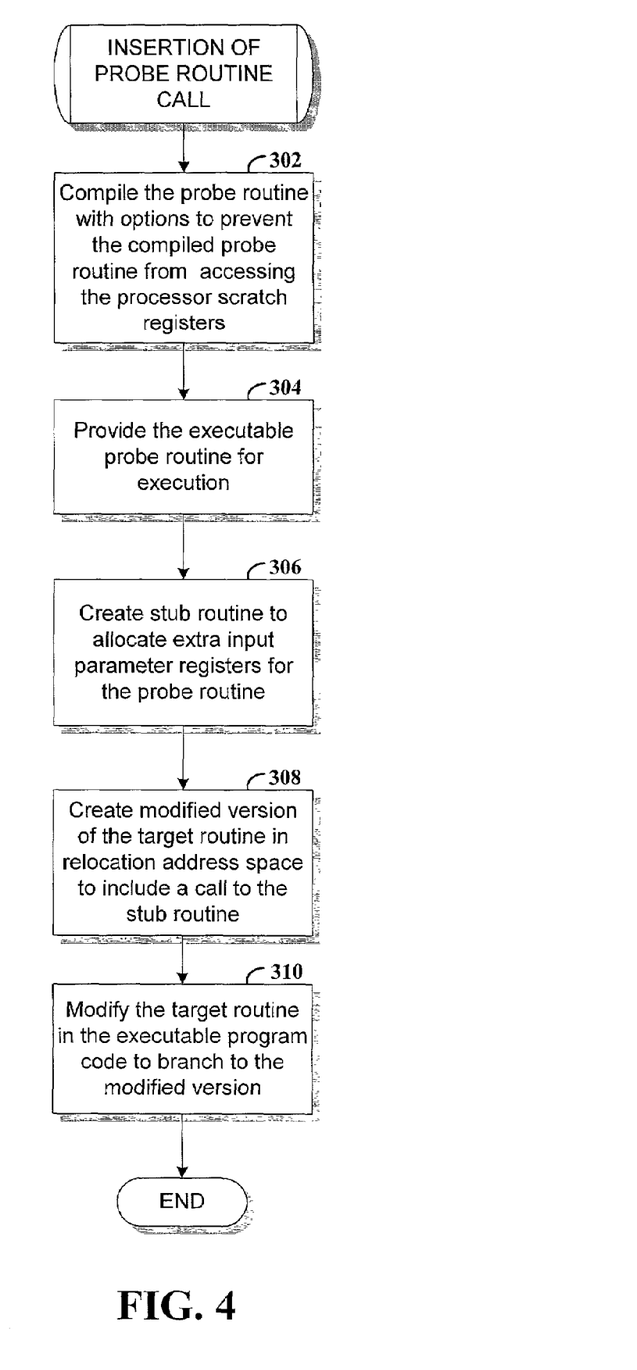
FIG. 4 is a flowchart of an example process for instrumenting a routine while preserving the context of the routine during instrumentation.

FIG. 4 is a flowchart of an example process for instrumenting a routine while preserving the context of the routine during instrumentation. The probe routine to be used to instrument a target routine is compiled (step 302) with options that cause the compiler to generate code that does not use scratch registers available from the processor. It will be appreciated that other processor architectures may have other types of registers whose use can be limited through compilation or other techniques.

The executable code for the probe routine is made available for execution by the target routine (step 304). In one embodiment, relocation address space is created by an instrumentation tool that controls execution of the program to be instrumented. The relocation address space is used to store instrumented versions of routines and the executable code of the probe routine. In one embodiment, the present invention uses the techniques described in the patent/application entitled, "DYNAMIC INSTRUMENTATION OF AN EXECUTABLE PROGRAM" by Hundt et al., filed on Apr. 11, 2001, and having patent Ser. No. 09/833,248, which is incorporated herein by reference, to allocate memory. In another embodiment, the executable code of the probe routine is stored to the memory stack space associated with the target routine. In yet another embodiment, the executable code of the probe routine is stored to the heap memory space allocated by the target routine.

The stub routine is made available for execution from the instrumented target routine at step 306. As with the probe routine, the stub routine may be stored in relocation address space, memory stack space, or heap memory space. It will be appreciated that a stub routine is created only once for a probe routine. Thus, wherever execution of the probe routine is desired in the program, a call to the stub routine can be inserted.

A modified version of the target routine is created (step 308) to include a call to the stub routine. The modified version of the target routine is stored in relocation address space, which is shared by the instrumentation tool and the executable program. The instrumentation tool lastly modifies the target routine in the executable program so that the modified version of the target routine is executed instead of the original target routine (step 310).

Figure 5:
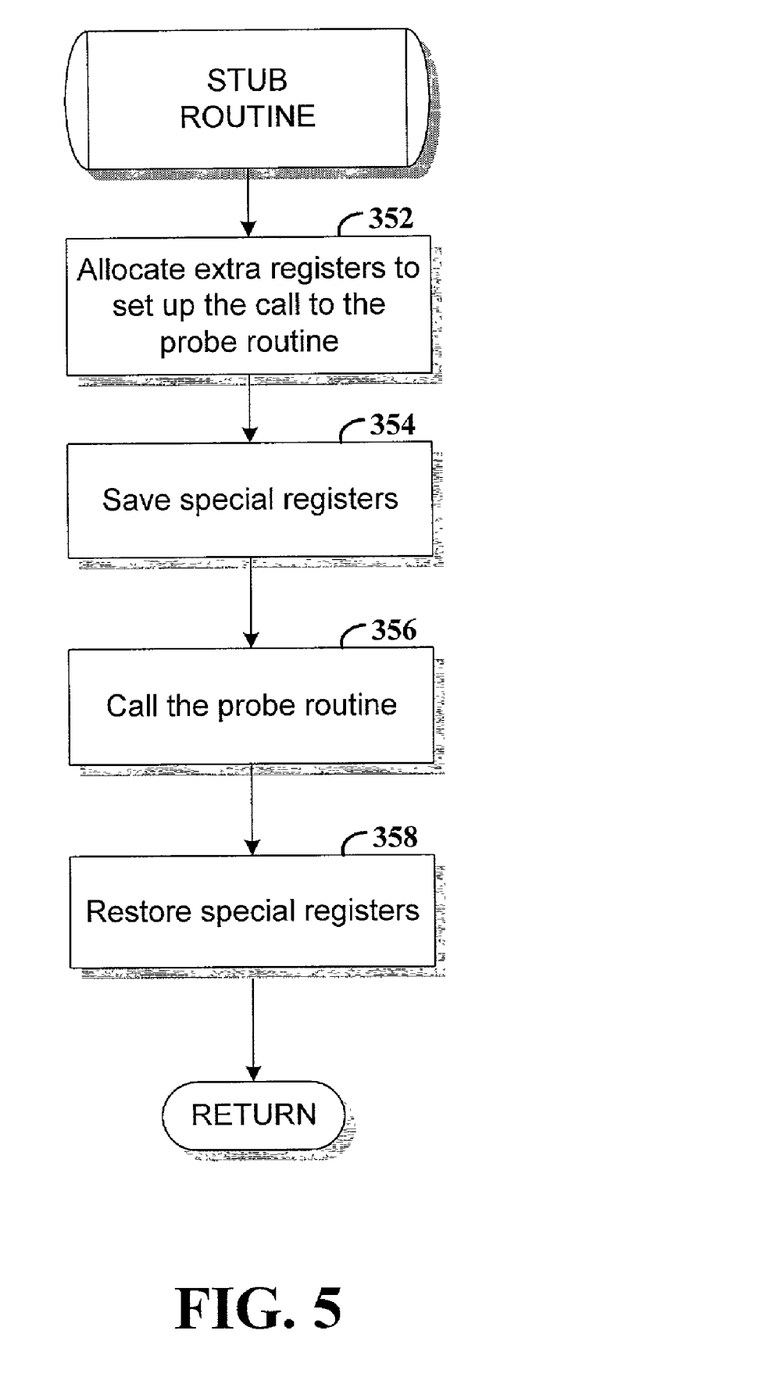
FIG. 5 is a flowchart of an example process performed by a stub routine in support of preserving the context of an instrumented routine.

FIG. 5 is a flowchart of an example process performed by a stub routine in support of preserving the context of an instrumented routine. The stub routine allocates dummy input registers sufficient in number to avoid overlap of input or local registers used by the probe routine with output registers of the instrumented target routine (step 352). Another set of registers, termed "special," are saved at step 354. The special registers are those other than the scratch registers (which are not used by the probe function) and the input parameter, local, and output parameter registers. In the example processor architecture, the special registers include the return-branch register and the ar.pfs register. The contents of the special registers are saved in memory associated with the stub routine.

The stub routine then calls the probe routine (step 356), and upon return from the probe routine the saved contents of the special registers are restored (step 358) before control is returned to the instrumented target function.

Figure 6:
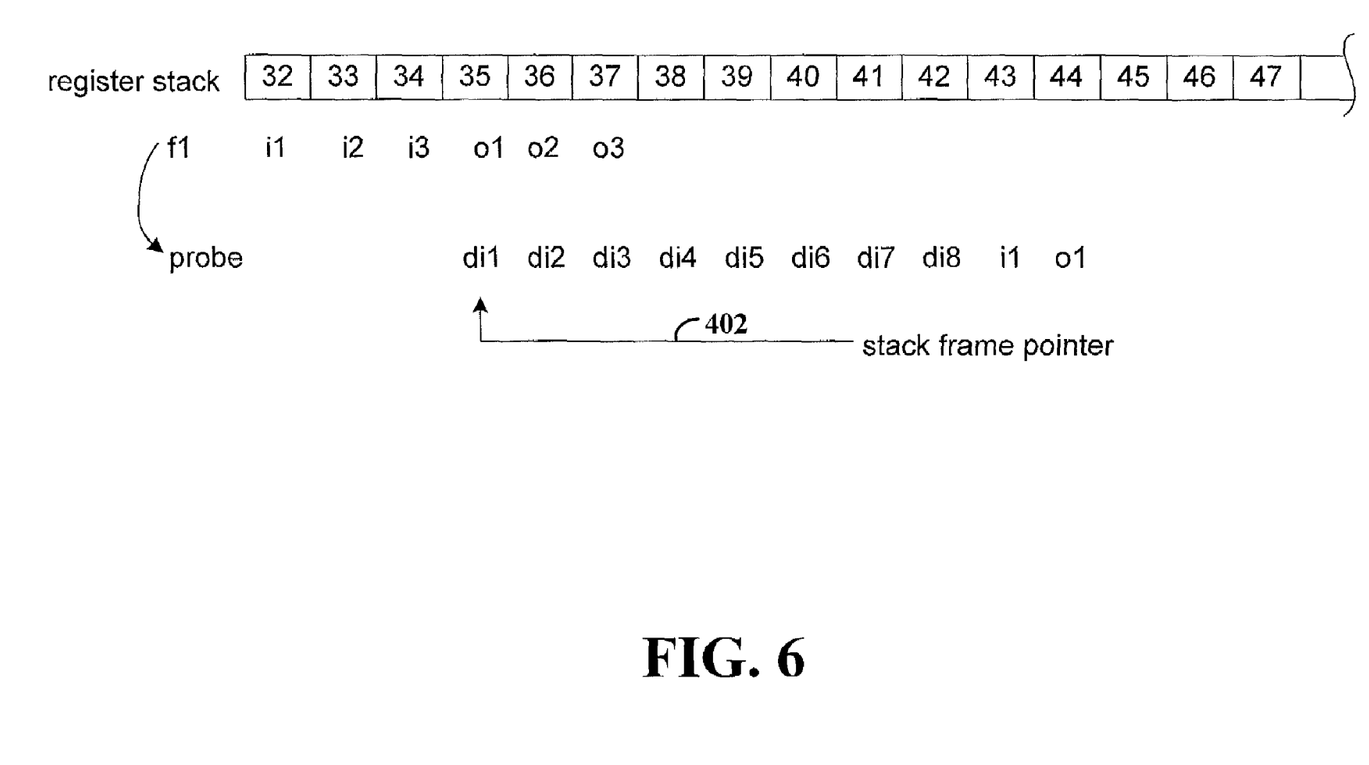
FIG. 6 illustrates a register stack and a routine call sequence in which target routine f1( ) is instrumented by a probe routine, and the context of f1( ) is preserved in accordance with another embodiment of the invention.

FIG. 6 illustrates a register stack and a routine call sequence in which target routine f1( ) is instrumented by a probe routine, and the context of f1( ) is preserved in accordance with another embodiment of the invention. The embodiment of FIG. 6 also involves the allocation of registers that are unused by probe. However, the registers are allocated by way of dummy input parameters that are included in the specification of probe. The probe routine does not use the dummy parameters (di1–di8), and the number of dummy parameters is the same as the number of additional registers allocated by the stub routine in the embodiment illustrated in FIG. 3. The stack pointer 402 references the base of the register stack frame for probe, which is register 35. Even though the stack pointer references registers used by f1 for output parameters, the fact that probe does not use the dummy registers eliminates the possibility of corrupting the register contents.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for causing execution of a probe routine from a target routine of an executable computer program code while preserving context of the target routine, the executable computer program code including an original version of the target routine, comprising:
   generating executable code for the probe routine, wherein the executable code does not reference a selected first set of registers accessible to the target routine;
   creating a modified version of the target routine, wherein execution of the modified version of the target routine causes execution of the probe routine;
   executing the modified version of the target routine instead of the original version when the target routine is called during program execution; and
   allocating when the probe routine is invoked a selected second set of registers that are accessible to the target routine, wherein the probe routine does not manipulate the second set of registers, and the second set of register is different from the first set of registers.

2. The method of claim 1, further comprising:
   creating a stub routine configured to allocate the second set of registers and invoke the probe routine;
   wherein the modified version of the target routine invokes the stub routine.

3. The method of claim 2, wherein the stub routine is further configured to save contents of a third set of registers before invoking the probe routine and restore saved contents of the third set of registers after the probe routine is complete, wherein the third set of registers is different from the first and second sets of registers.

4. The method of claim 1, wherein the probe routine is specified with a plurality of dummy parameters to cause allocation of the second set of registers.

5. The method of claim 1, further comprising:
   controlling execution of the executable program code with an instrumentation program; and
   storing the modified version of the target routine, and the executable code for the probe routine in relocation address space that is shared between the executable program code and the instrumentation program.

6. The method of claim 1, further comprising:
   controlling execution of the executable program code with an instrumentation program; and
   storing the modified version of the target routine, and the executable code for the probe routine in stack space associated with the target routine.

7. The method of claim 1, further comprising:
   controlling execution of the executable program code with an instrumentation program; and
   storing the modified version of the target routine, and the executable code for the probe routine in memory space allocated by the target routine.

8. A method for inserting a probe routine call in a target routine of an executable computer program code while preserving context of the target routine, the executable computer program code including an original version of the target routine and executable on a processor having a register stack for saving context of routines, comprising:
   allocating registers on the register stack for storing input parameters to and output parameters from a routine when the routine is invoked;
   when a first routine calls a second routine, reallocating on the register stack registers that are allocated for storing output parameters of the first routine for storing input parameters to the second routine;
   when control is returned from the second routine to the first routine, reallocating on the register stack registers that are allocated for storing input parameters to the second routine for storing output parameters of the first routine;
   creating a modified version of the target routine, wherein execution of the modified version of the target routine causes execution of the probe routine;
   executing the modified version of the target routine instead of the original version when the target routine is called during program execution; and
   allocating prior to executing the probe routine a set of registers on the register stack for dummy input parameters to the probe routine, wherein the dummy input parameters are unused by the probe routine.

9. The method of claim 8, further comprising generating executable code for the probe routine, wherein the executable code does not reference a selected first set of registers accessible to the target routine.

10. The method of claim 9, further comprising:
creating a stub routine configured to allocate the second set of registers and invoke the probe routine;
wherein the modified version of the target routine invokes the stub routine.

11. The method of claim 10, wherein the stub routine is further configured to save contents of a third set of registers before invoking the probe routine and restore saved contents of the third set of registers after the probe routine is complete, wherein the third set of registers is different from the first and second sets of registers.

12. The method of claim 10, wherein the probe routine is specified with a plurality of dummy parameters to cause allocation of the second set of registers.

13. The method of claim 10, further comprising:
controlling execution of the executable program code with an instrumentation program; and
storing the modified version of the target routine, and the executable code for the probe routine in relocation address space that is shared between the executable program code and the instrumentation program.

14. The method of claim 10, further comprising:
controlling execution of the executable program code with an instrumentation program; and
storing the modified version of the target routine, and the executable code for the probe routine in stack space associated with the target routine.

15. The method of claim 10, further comprising:
controlling execution of the executable program code with an instrumentation program; and
storing the modified version of the target routine, and the executable code for the probe routine in memory space allocated by the target routine.

16. A computer apparatus for causing execution of a probe routine from a target routine of an executable computer program code while preserving context of the target routine, the executable computer program code including an original version of the target routine, comprising:
means for generating executable code for the probe routine, wherein the executable code does not reference a selected first set of registers accessible to the target routine;
means for creating a modified version of the target routine, wherein execution of the modified version of the target routine causes execution of the probe routine;
means for executing the modified version of the target routine instead of the original version when the target routine is called during program execution; and
means for allocating when the probe routine is invoked a selected second set of registers that are accessible to the target routine, wherein the probe routine does not manipulate the second set of registers, and the second set of register is different from the first set of registers.

17. A method for inserting a probe routine call in a target routine of an executable computer program code while preserving context of the target routine, the executable computer program code including an original version of the target routine and executable on a processor having a register stack for saving context of routines, comprising:
means for allocating registers on the register stack for storing input parameters to and output parameters from a routine when the routine is invoked;
means for reallocating, when a first routine calls a second routine, on the register stack registers that are allocated for storing output parameters of the first routine for storing input parameters to the second routine;
means for reallocating, when control is returned from the second routine to the first routine, on the register stack registers that are allocated for storing input parameters to the second routine for storing output parameters of the first routine;
means for creating a modified version of the target routine, wherein execution of the modified version of the target routine causes execution of the probe routine;
means for executing the modified version of the target routine instead of the original version when the target routine is called during program execution; and
means for allocating prior to executing the probe routine a set of registers on the register stack for dummy input parameters to the probe routine, wherein the dummy input parameters are unused by the probe routine.

18. A computer readable storage medium configured with executable instructions for causing one or more computers to perform a method of causing execution of a probe routine from a target routine of an executable computer program code while preserving context of the target routine, the executable computer program code including an original version of the target routine, the method comprising:
generating executable code for the probe routine, wherein the executable code does not reference a selected first set of registers accessible to the target routine;
creating a modified version of the target routine, wherein execution of the modified version of the target routine causes execution of the probe routine;
executing the modified version of the target routine instead of the original version when the target routine is called during program execution; and
allocating when the probe routine is invoked a selected second set of registers that are accessible to the target routine, wherein the probe routine does not manipulate the second set of registers, and the second set of register is different from the first set of registers.

19. A computer readable storage medium configured with executable instructions for causing one or more computers to perform a method of inserting a probe routine call in a target routine of an executable computer program code while preserving context of the target routine, the executable computer program code including an original version of the target routine and executable on a processor having a register stack for saving context of routines, the method comprising:
allocating registers on the register stack for storing input parameters to and output parameters from a routine when the routine is invoked;
when a first routine calls a second routine, reallocating on the register stack registers that are allocated for storing output parameters of the first routine for storing input parameters to the second routine;
when control is returned from the second routine to the first routine, reallocating on the register stack registers that are allocated for storing input parameters to the second routine for storing output parameters of the first routine;
creating a modified version of the target routine, wherein execution of the modified version of the target routine causes execution of the probe routine;
executing the modified version of the target routine instead of the original version when the target routine is called during program execution; and
allocating prior to executing the probe routine a set of registers on the register stack for dummy input parameters to the probe routine, wherein the dummy input parameters are unused by the probe routine.

* * * * *